(12) United States Patent
Eilersen

(10) Patent No.: US 11,408,763 B2
(45) Date of Patent: Aug. 9, 2022

(54) LOAD CELL LIFT-OFF PROTECTION DEVICE

(71) Applicant: Niels Aage Juul Eilersen, Vedbaek (DK)

(72) Inventor: Niels Aage Juul Eilersen, Vedbaek (DK)

( * ) Notice: Subject to any disclaimer, the term of this patent is extended or adjusted under 35 U.S.C. 154(b) by 303 days.

(21) Appl. No.: 16/652,253

(22) PCT Filed: Sep. 7, 2018

(86) PCT No.: PCT/DK2018/000091
§ 371 (c)(1),
(2) Date: Mar. 30, 2020

(87) PCT Pub. No.: WO2019/068292
PCT Pub. Date: Apr. 11, 2019

(65) Prior Publication Data
US 2020/0240831 A1  Jul. 30, 2020

(30) Foreign Application Priority Data

Oct. 2, 2017  (DK) .......................... PA 2017 00548

(51) Int. Cl.
| | |
|---|---|
| *G01G 21/24* | (2006.01) |
| *G01G 21/23* | (2006.01) |
| *G01G 1/26* | (2006.01) |
| *G01G 23/00* | (2006.01) |
| *G01G 23/12* | (2006.01) |
| *G01L 1/26* | (2006.01) |

(52) U.S. Cl.
CPC ............. *G01G 21/24* (2013.01); *G01G 21/23* (2013.01); *G01G 23/002* (2013.01); *G01G 23/12* (2013.01); *G01L 1/26* (2013.01)

(58) Field of Classification Search
CPC .......... G01L 1/26; G01G 19/02; G01G 21/23; G01G 21/24; G01G 23/002; G01G 23/02; G01G 23/06; G01G 23/12
See application file for complete search history.

(56) References Cited

U.S. PATENT DOCUMENTS

| | | | | |
|---|---|---|---|---|
| 4,411,327 A | * | 10/1983 | Lockery ............... | G01G 3/1402 177/DIG. 9 |
| 4,483,404 A | * | 11/1984 | Weihs .................... | G01G 19/02 177/DIG. 9 |
| 4,744,254 A | * | 5/1988 | Barten ..................... | G01L 1/26 73/862.622 |
| 5,600,104 A | * | 2/1997 | McCauley ............. | G01G 19/12 177/136 |
| 5,894,112 A | * | 4/1999 | Kroll ..................... | G01G 19/02 177/164 |
| 6,150,619 A | * | 11/2000 | Borngasser ............ | G01G 21/23 177/DIG. 9 |

FOREIGN PATENT DOCUMENTS

| | | |
|---|---|---|
| DE | 830337 U1 | 7/1983 |
| DE | 9302752 U1 | 4/1993 |
| DE | 29718113 U1 | 2/1998 |
| EP | 1193480 A1 | 4/2002 |

* cited by examiner

*Primary Examiner* — Randy W Gibson
(74) *Attorney, Agent, or Firm* — David Guerra

(57) ABSTRACT

Load cell lift-off protection devices with the load to be measured applied directly to the spherical upper surface of the load cell and with locking members which are locking grooves in the load cell force introducing parts to grooves in the structure of the weighed installation.

20 Claims, 5 Drawing Sheets

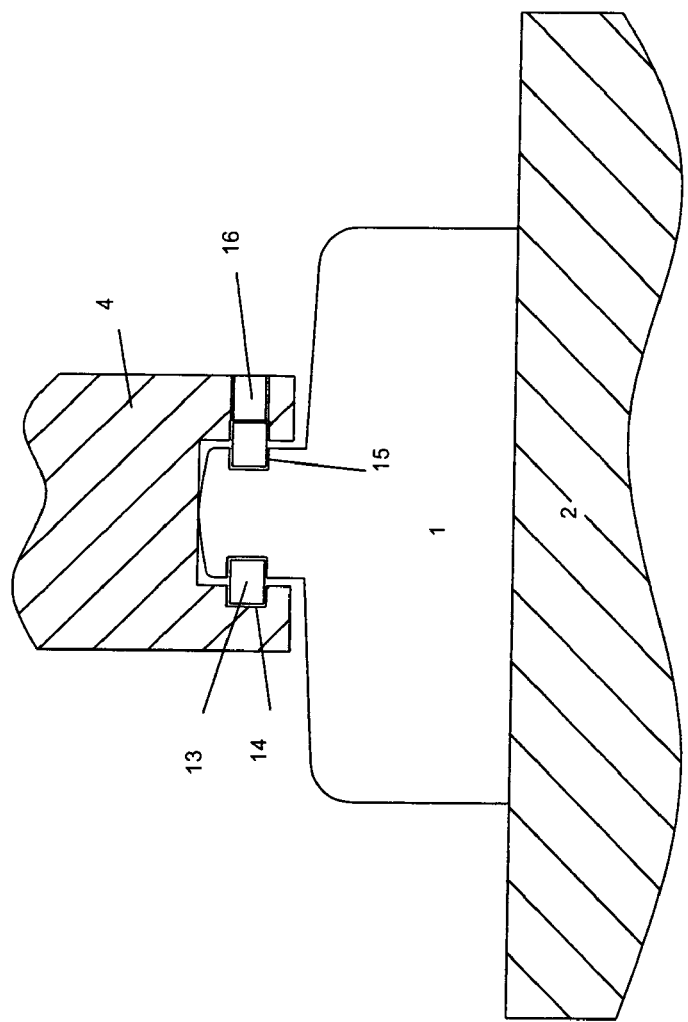

LOAD CELL LIFT-OFF PROTECTION DEVICE

CROSS-REFERENCE TO RELATED APPLICATIONS

This application is an U.S. national phase application under 35 U.S.C. § 371 based upon International Application No. PCT/DK2018/000091 filed on Sep. 7, 2018. Additionally, this U.S. national phase application claims the benefit of priority of International Application No. PCT/DK2018/000091 filed on Sep. 7, 2018, which claims priority to German Application No. PA 2017 00448 filed on Oct. 2, 2017. The entire disclosures of the prior applications are incorporated herein by reference. The international application was published on Apr. 11, 2019 under Publication No. WO 2019/068292 A1.

BACKGROUND

Technical Field

The invention relates to a device for securing that the connection between a load and a load cell is ensured even under adverse operational conditions with negative loads on a load cell.

The invention relates more specifically to installations where load cells are used for weighing on silos, mixing machinery etc. and where there is a risk of the weighed installation accidentally being tilted or falling over.

Background Description

These situations are found when the weighed installation is hit by a vehicle, or because of strong winds or earthquakes.

Apart from the obvious risk to personnel, there is also the risk of high costs when a weighed installation is tilted and falling to the ground.

FIG. 1 show a commonly used way of securing a weighing installation against tilting where 1 is the load cell, 2 is a concrete surface, 3 is a load introducing part and 4 is a part of the structure of the weighed installation. The two bolts 5, which are fastened in the concrete surface 2 are passing through two holes 6 in the beam 7, which is welded to the structure member 4. The nuts 8 are securing that the weighed installation cannot be lifted off the load cell 1. The accuracy of this commonly used weighing solution is totally dependent on that the beam 7 is not in contact with the bolts 5 nor the nuts 8. These conditions are often violated in practice by the installation of the weighing system and later in use. Besides this obvious problem, this solution with the rather long bolts, is not stable with strong horizontal forces, which for example are seen during earthquakes.

Another common solution is to secure the weighed installation by one or more bolts mounted in the upper surface of the load cell, but this solution will invariably introduce parasitic forces into the load cell, lowering the accuracy.

SUMMARY

It is the object of the invention to provide a weighed installation which can operate with and transfer negative forces to the load cell, and which at the same time guarantees a simple installation with a high accuracy of the weighing.

According to the invention this object is obtained by locking the weighed installation to the load cell with locking members which are ensuring a reliable function and which are not introducing parasitic forces into the load cell.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIG. 4 is a cross-sectional view of an embodiment of the present technology with the locking members fitted into grooves.

FIG. 5 is a perspective view of an embodiment of the locking members in the form of cylindrical rollers.

FIG. 6 is a perspective view of an embodiment of the locking members fittable in the grooves.

DETAILED DESCRIPTION OF THE PREFERRED EMBODIMENTS

Figure 1:
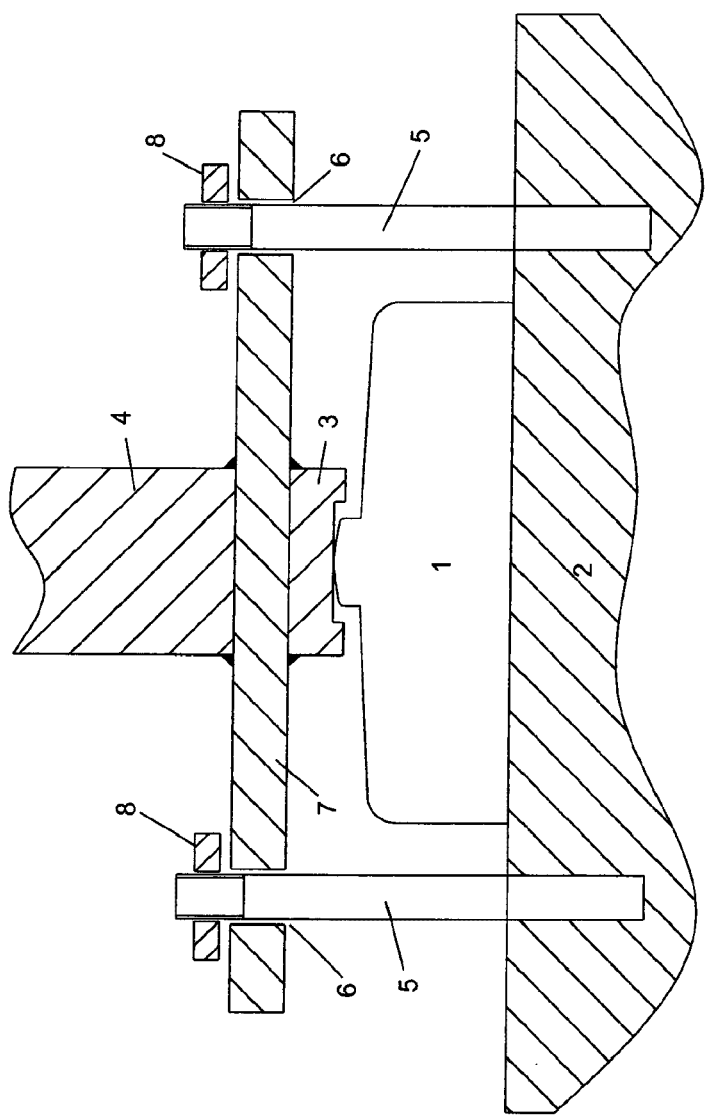
FIG. 1 is a cross-sectional view of a prior art way of securing a weighing installation against tilting.
Figure 2:
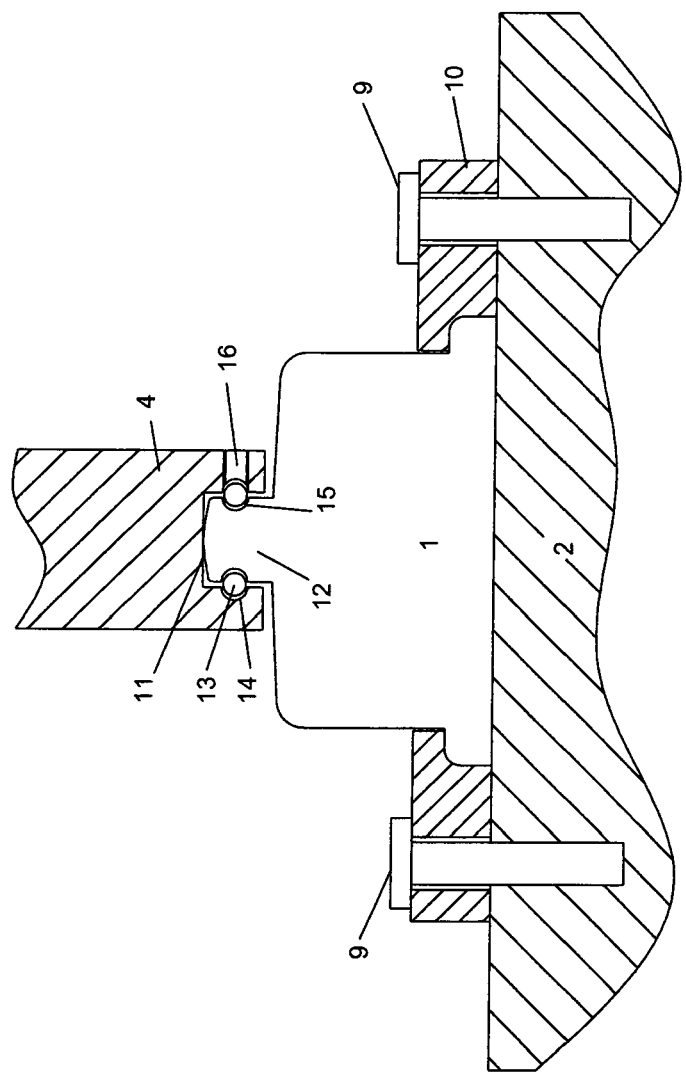
FIG. 2 is a cross-sectional view of an embodiment of the present technology with the load cell clamped down on the surface.

In the embodiment of the invention shown in FIG. 2, the load cell 1 is clamped down on the surface 2 by the bolts 9 securing the ring or plate 10. The part 4 of the structure of the weighed installation is resting on the spherical upper surface 11 of the force introduction part 12 of the load cell 1. The locking members 13 are placed in the groove 14 of the part 4 and the groove 15 of the force introduction part 12.

The locking members 13, which are shown as possibly being spherical balls are introduced into the grooves 14 and 15 through the opening 16 in the part 4. The grooves are preferably completely filled with locking members to ensure that the highest possible load can be taken up by the load cell lift-off protection device in critical situations. The opening 16 is preferably closed by a threaded screw and additional openings 16 are preferably provided for a possible later easy removal of the locking members 13 when performing service on the load cell installation. The locking members 13 are preferably magnetic for even more easy removal.

Figure 3:
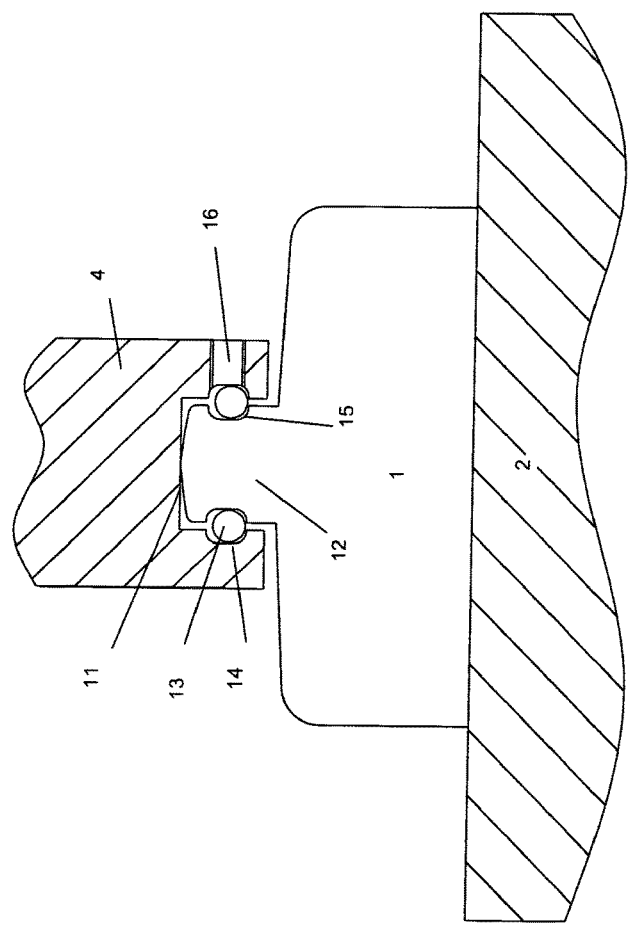
FIG. 3 is a cross-sectional view of an embodiment of the present technology with the height of the groove being higher than the height or diameter of the locking member.

In the embodiment of the invention shown in FIG. 3, the height of the groove 14 and or possibly the groove 15 are higher than the height or diameter of the locking member 13. This allows the part 4 to tilt to a certain degree without introducing parasitic bending moments into the load cell as the load applied to the load cell is just shifting on the spherical surface 11 of the force introduction part 12.

That the load is applied to the spherical surface 11 without any interference from the lift off protection is a prerequisite for a high accuracy of the weighing.

In the embodiment of the invention shown in FIG. 4 the locking members 13 are shown as locking members fitting into the essentially rectangular grooves 14 and 15, which may have height which is equal to or preferably higher than the height of the locking members 13.

FIG. 5 show locking members in the form of cylindrical rollers with a height fitting into the grooves 14 and 15, and FIG. 6 show locking members with a height fitting into the grooves 14 and 15 and with an inner and outer radius fitting into respectively the grooves 15 and 14.

These embodiments of the invention can take up much higher loads than the spherical balls.

Figure 7:
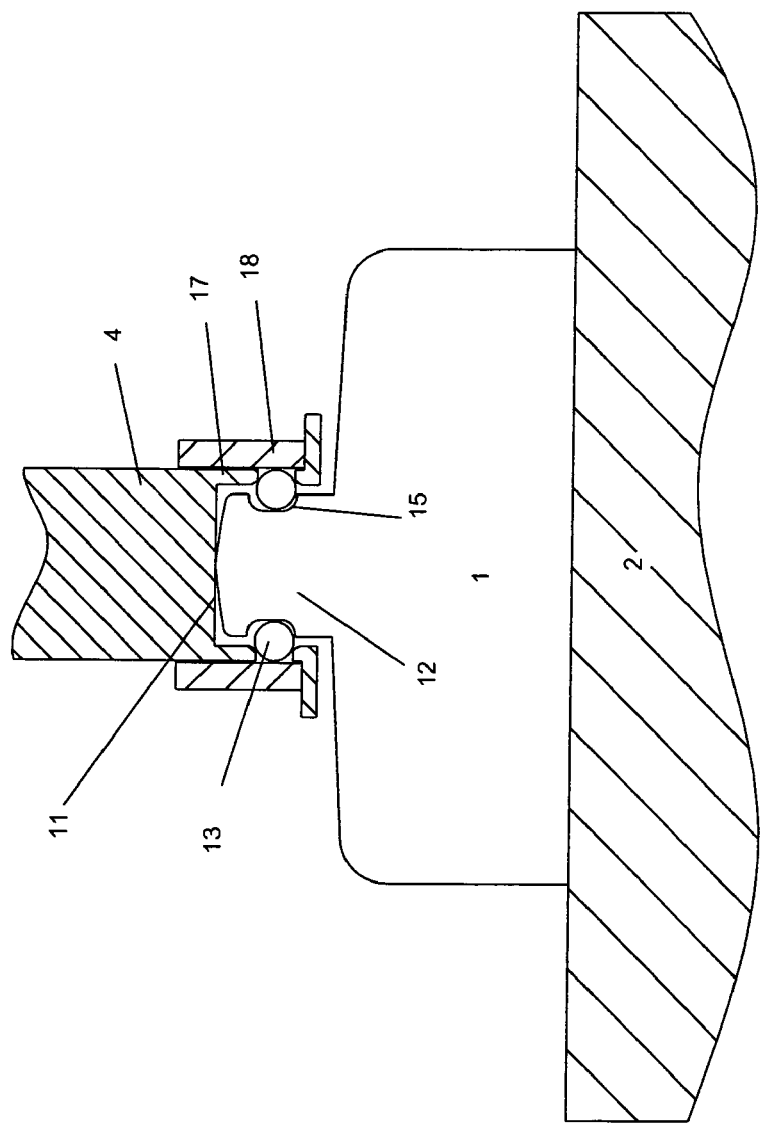
FIG. 7 is a cross-sectional view of an embodiment of a load cell assembly of the present technology.

FIG. 7 shows a sectional view of a load cell assembly, where a first end of the load cell 1 may be attached (not shown) to the base 2, where the load cell is provided with a second end, the force introduction part 12, configured to receive a load from a load transmission member 4. The load transmission member is provided with a recess 17 having a size that is larger than the outer diameter of the second end of the load cell, so that the second end 12 may be introduced into the recess of the load transmission member.

The peripheral edge of the second end 12 may be provided with one or more grooves, that may be adapted to receive an intermediate coupling element 13, where the intermediate coupling element is locked to the side walls of the recess 17. The coupling element 13 may be adapted to move in a radial direction, so that prior to the placement of the load transmission member onto the load cell, the coupling elements are retracted, allowing the side walls of the recess to slip over the second end of the load cell. When the recess has been positioned over the second end, a locking sleeve 18 may be utilized to press the coupling members 13 in a radial inwards direction, allowing the coupling members to engage with the grooves, in order to prevent the load transmission member to be released from the load cell. I.e. the inner diameter of the coupling members, when engaged is smaller than the outer diameter of the grooves, so that the upper edge of the grooves will engage the coupling elements 13 if the load transmission member is pulled in a direction away from the load cell 1.

The grooves are configured to have a vertical dimension that is larger than the vertical dimensions of the coupling element, allowing the coupling element to have a margin of movement (latitude) between the lower edge of the groove and the upper edge of the groove.

By providing a margin of movement, the load transmission member 4 will be capable of tilting away from a vertical axis (central axis of the load cell) without the coupling member to come into engagement with the upper edge of the groove. I.e. that the coupling element may move in a vertical direction within the groove without engaging the groove. This ensures that the angled movement of the load transmission member will not transfer any interfering forces into the load cell, such as forces that are in a direction other than in the vertical direction. Thus, the forces that effect the movement of the load transferring member to tilt, will not affect the second end of the load cell, ensuring that parasitic forces applied to the load transmission member are isolated from the load cell.

The attachment between the load transmission member and the second end of the load cell in a direction towards the load cell is ensured between the contact surface of the load cell and the contact surface of the load transmission member, so that the load applied to the load transmission member to be measured by the load cell is directly transmitted to the load cell. The attachment in the opposite direction is however secured by the coupling element, allowing some leeway of movement between the load cell and load transmission member in an upwards direction (vertical direction away from the load cell, as well as a tilting movement of the load transmission member, relative to the load cell.

Items

1. Load cell lift-off protection devices with the load to be measured applied directly to the spherical upper surface of the load cell, characterized in that locking members are locking grooves in the load cell force introducing parts to grooves in the structure of the weighed installation.

2. Load cell lift-off protection devices according to item 1, where the grooves are adapted to spherical balls as locking members.

3. Load cell lift-off protection devices according to item 2, where the grooves are higher to allow tilting.

4 Load cell lift-off protection devices according to item 1, where the grooves are essentially rectangular to adapt locking members with a cylindrical cross section.

The invention claimed is:

1. A load cell system configured to measure an axial load in a direction of a central axis of a load cell, the load cell system comprising a load cell body having a first end and a second end, the second end having a cell body groove defined therein;

a load transmission member configured to transfer the axial load of a weighed installation to the load cell body in a direction coaxial with the central axis of the load cell, the load transmission member defining a transmission member recess configured to receive at least a part of the second end of the load cell body so that the cell body groove is substantially aligned with a transmission member groove defined in the load transmission member that is in communication with the transmission member recess;

a first connection arrangement configured to securely attach the first end of the load cell body to a base; and one or more locking members configured to attach the second end of the load cell body to the load transmission member, opposite portions of the locking members being in part receivable in the cell body groove and the transmission member groove, respectively when the second end is received in the transmission member recess;

wherein any one of or combination of the locking members, the cell body groove and the transmission member groove being configured to provide a margin/latitude movement allowing the load transmission member to tilt at an angle relative to the central axis of the load cell body.

2. The load cell system according to claim 1, wherein the second end of the load cell body includes a spherical or curved free end surface.

3. The load cell system according to claim 2, wherein a contact surface of the load transmission member that in part defines the transmission member recess is in contact with the spherical or curved free end surface when the second end is locked in the transmission member recess utilizing the locking members.

4. The load cell system according to claim 1, wherein the locking members are selected from the group consisting of a cam, a bearing ball, a spherical member, a spherical ball, and a bolt, that are engageable with the cell body groove and the transmission member groove when in an opposing orientation.

5. The load cell system according to claim 1, wherein a height of the cell body groove and the transmission member groove are each larger than a height of the locking members.

6. The load cell system according to claim 1, wherein the cell body groove and the transmission member groove are essentially rectangular in cross section to adapt the locking members of a cylindrical cross section.

7. The load cell system according to claim 1, wherein the first connection arrangement includes a flanged portion that contact a flanged portion of the first end of the load cell body to secure the load cell body to the base.

8. The load cell system according to claim 1, wherein the load transmission member includes an opening defined therethrough in communication with the transmission member groove.

9. The load cell system according to claim 8, wherein the opening has a size greater that the locking members for receiving the locking members therethrough and positioning the locking members in part in the cell body groove and the transmission member groove.

10. The load cell system according to claim 9, wherein the opening is configured to threadably receive a screw to close off the opening and prevent the locking members from exiting through the opening.

11. The load cell system according to claim 1, wherein the transmission member groove is an opening defined through the load transmission member, and the system further comprises a locking sleeve configured to receive a portion of the load transmission member and cover the opening.

12. The load cell system according to claim 11, wherein the locking sleeve is configured to press the locking members in a radial inwards direction toward the cell body groove.

13. A load cell system configured to measure an axial load in a direction of a central axis of a load cell, the load cell system comprising
    a load cell body having a first end and a second end, the second end having a cell body groove defined therein and a spherical or curved free end;
    a load transmission member configured to transfer the axial load of a weighed installation to the load cell body in a direction coaxial with the central axis of the load cell, the load transmission member defining a transmission member recess configured to receive at least a part of the second end of the load cell body so that the cell body groove is substantially aligned with a transmission member groove defined in the load transmission member that is in communication with the transmission member recess, the load transmission member including a contact surface that in part defines the transmission member recess;
    a first connection arrangement configured to securely attach the first end of the load cell body to a base; and
    one or more locking members configured to attach the second end of the load cell body to the load transmission member, opposite portions of the locking members being in part receivable in the cell body groove and the transmission member groove, respectively when the second end is received in the transmission member recess;
    wherein the spherical or curved free end surface of the second end is in contact with the contact surface when the load cell body is locked in the transmission member recess utilizing the locking members
    wherein any one of or combination of the locking members, the cell body groove and the transmission member groove being configured to provide a margin/latitude movement allowing the load transmission member to tilt at an angle relative to the central axis of the load cell body.

14. The load cell system according to claim 13, wherein the locking members are selected from the group consisting of a cam, a bearing ball, a spherical member, a spherical ball, and a bolt, that are engageable with the cell body groove and the transmission member groove when in an opposing orientation.

15. The load cell system according to claim 13, wherein a height of the cell body groove and the transmission member groove are each larger than a height of the locking members.

16. The load cell system according to claim 13, wherein the cell body groove and the transmission member groove are essentially rectangular in cross section to adapt the locking members of a cylindrical cross section.

17. The load cell system according to claim 13, wherein the first connection arrangement includes a flanged portion that contact a flanged portion of the first end of the load cell body to secure the load cell body to the base.

18. The load cell system according to claim 13, wherein the load transmission member includes an opening defined therethrough in communication with the transmission member groove.

19. The load cell system according to claim 18, wherein the opening has a size greater that the locking members for receiving the locking members therethrough and positioning the locking members in part in the cell body groove and the transmission member groove, and wherein the opening is configured to threadably receive a screw to close off the opening and prevent the locking members from exiting through the opening.

20. The load cell system according to claim 13, wherein the transmission member groove is an opening defined through the load transmission member, and the system further comprises a locking sleeve configured to receive a portion of the load transmission member and cover the opening, and wherein the locking sleeve is configured to press the locking members in a radial inwards direction toward the cell body groove.

\* \* \* \* \*